(12) United States Patent
Pan

(10) Patent No.: US 7,328,443 B2
(45) Date of Patent: Feb. 5, 2008

(54) ADJUSTABLE PICKUP HEAD GUIDE APPARATUS

(75) Inventor: Guo-Chen Pan, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 577 days.

(21) Appl. No.: 10/892,806

(22) Filed: Jul. 16, 2004

(65) Prior Publication Data

US 2005/0097585 A1 May 5, 2005

(30) Foreign Application Priority Data

Nov. 1, 2003 (CN) .................. 2003 2 0117727 U

(51) Int. Cl.
*G11B 7/085* (2006.01)
(52) U.S. Cl. ...................................... 720/674
(58) Field of Classification Search ............... 720/706, 720/674, 675; 369/271.1, 219.1, 244.1, 270.1
See application file for complete search history.

(56) References Cited

U.S. PATENT DOCUMENTS 5,933,408 A    8/1999    Park et al.

| | | | |
|---|---|---|---|
| 6,385,160 B1 * | 5/2002 | Jeon | 720/675 |
| 6,813,773 B2 * | 11/2004 | Liao et al. | 720/675 |
| 2002/0172137 A1 * | 11/2002 | Min | 369/249 |
| 2004/0246830 A1 * | 12/2004 | Bao | 369/44.14 |

FOREIGN PATENT DOCUMENTS

| | | |
|---|---|---|
| CN | 01219230 | 3/2002 |
| TW | 86219334 | 11/1997 |

* cited by examiner

*Primary Examiner*—Allen Cao
(74) *Attorney, Agent, or Firm*—Morris Manning Martin LLP; Tim Tingkang Xia, Esq.

(57) ABSTRACT

A pickup head guide apparatus (1) includes two guide shafts (2), a fixing seat (3) with a first groove (30) therein to accommodate one end of a corresponding one of the guide shafts, three adjusting seats (4), and three corresponding adjusting devices (5). Each adjusting seat has a second groove therein to accommodate a corresponding one of the other three ends of the guide shafts. Each adjusting device includes an elastic element (52) positioned in the second groove, and a fixture element (51) which is adjustable from either of two opposite ends thereof. The elastic element and the fixture element engage with the corresponding guide shaft to accurately position the guide shaft.

20 Claims, 3 Drawing Sheets

ADJUSTABLE PICKUP HEAD GUIDE APPARATUS

BACKGROUND OF THE INVENTION

1. Field of the Invention

The present invention relates to a guide mechanism for guiding a pickup head, and particularly to a guide mechanism for guiding a pickup head with respect to an information disk such as an optical disk loaded into a reproducing and/or recording device such as an optical disk drive.

2. Description of Prior Art

Conventionally, an optical disk recording and/or reproducing device includes a loader for loading and ejecting disks, a turntable for rotating loaded disks, a pickup head which generates a laser beam perpendicularly radiating to a loaded disk for reproducing signals from the disk or recording signals onto the disk, and a feeding apparatus for moving the pickup head back and forth along a predetermined radial path of the loaded disk. Common optical disks used include CD-RW (compact disk-rewritable) disks and CD-ROM (compact disk-read only memory) disks. The feeding apparatus includes a driving system for generating a driving force applied to the pickup head, and a guide apparatus for enabling the pickup head to move along the radial path of the loaded disk.

The guide apparatus includes two parallel guide rods that define the path of movement of the optical pickup head, and four fixing seats mounted on a base of the recording and/or reproducing device for connecting the two guide rods with the base. Each fixing seat has a groove therein to receive and fasten the end of a corresponding guide rod, with a fixture screw being engaged with the fixing seat in order to further secure the fastening of the end of the guide rod. The pickup head is hung between the two guide rods. This kind of guide apparatus is described in P.R. China patent no. 01219230.

The rapid advancement of multimedia applications has spawned systems that store information more compactly. In particular, the distance between adjacent recording pits of a modern optical disk is less than previously. This in turn requires that the laser beam generated by the pickup head perpendicularly radiates into the desired pit when recording or reproducing signals to or from disks. Thus the guide rods should be precisely parallel to the optical disk and at exactly the same height above the optical disk. However, each end of each guide rod is directly fastened on the bottom surface of the corresponding fixing seat. The bottom surface may not be completely smooth or may in other respects be uneven because of machining tolerances. This means that the guide rods may not be perfectly horizontal or may be located at different heights. If so, the laser beam transmitted by the optical pickup head slantingly radiates into the desired pit and is liable to fail to properly read/write information from/to the disk.

For these reasons, many manufacturers have been developing adjustable guide apparatuses, in which the positions of the guide rods are changeable. An adjustment device is provided in the guide apparatus. An operator can manually adjust the adjustment device with the help of a testing machine, so as to position the guide rods in the desired locations. However, problems remain. For example, when the guide apparatus is fixed in the testing machine, it is inconvenient for the operator to access the adjustment device and adjust the positions of the guide rods manually. This retards the speed, accuracy and efficiency of production.

SUMMARY OF THE INVENTION

Accordingly, an object of the present invention is to provide a guide device for a disk-type recording/reproducing device, in which the guide device can be conveniently adjusted and precisely positioned.

In order to achieve the object set out above, a pickup head guide apparatus includes two guide shafts, a fixing seat with a first groove therein to accommodate one end of a corresponding one of the guide shafts, three adjusting seats and three corresponding adjusting devices. Each adjusting seat has a second groove therein to accommodate a corresponding one of the other three ends of the guide shafts. Each adjusting device includes an elastic element positioned in the second groove, and a fixture element which is adjustable from either of two opposite ends thereof. The elastic element and the fixture element engage with the corresponding guide shaft to accurately position the guide shaft.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Reference will now be made to the drawings to describe the preferred embodiment of the present invention in detail.

Figure 1:
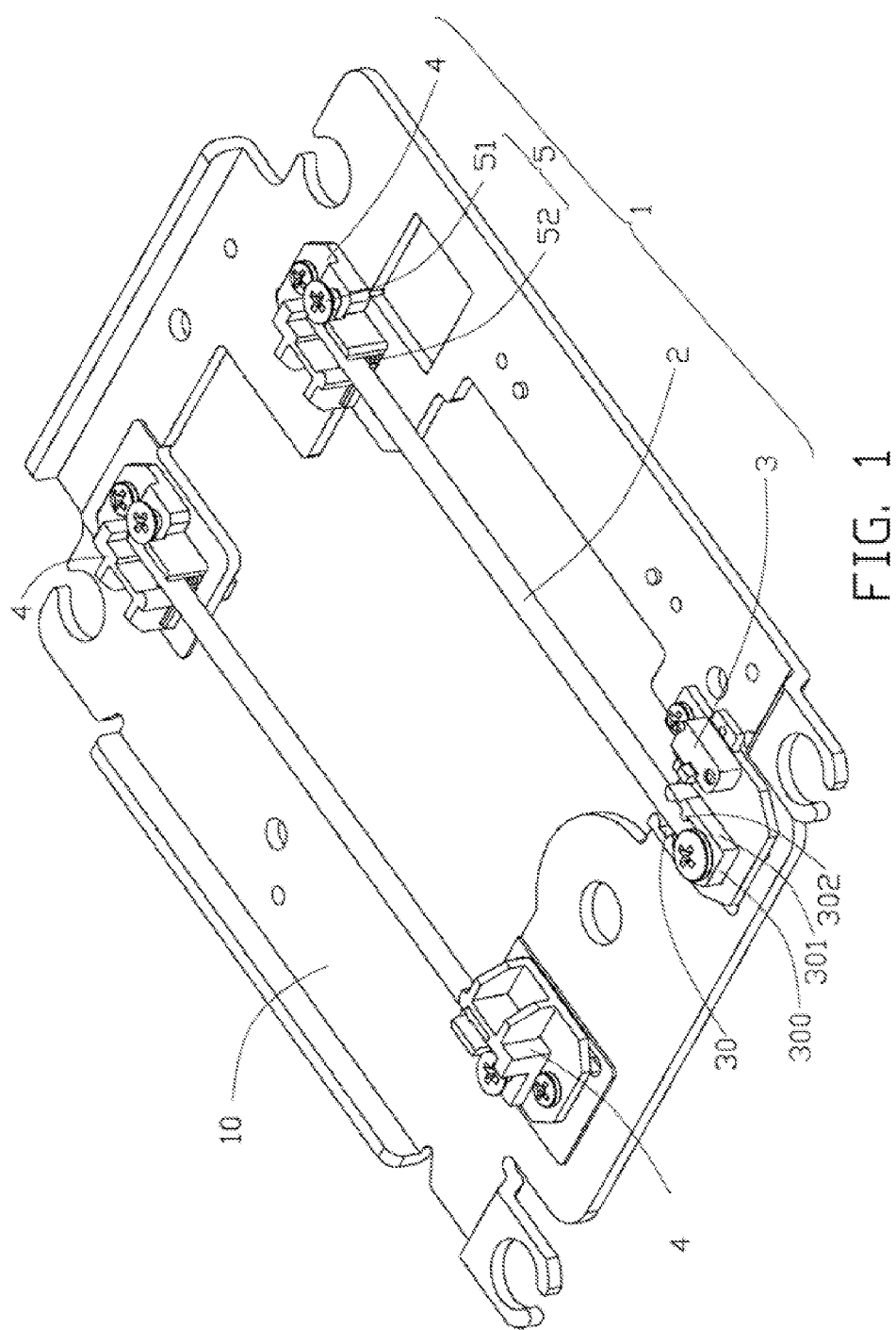
FIG. 1 is an isometric view of a pickup head guide apparatus in accordance with the present invention, which is mounted on a chassis of an optical recording/reproducing device.

Referring initially to FIG. 1, a pickup head guide apparatus 1 for an optical recording/reproducing device comprises a pair of guide shafts 2, a fixing seat 3, three adjusting seats 4, and three adjusting devices 5 corresponding to the three adjusting seats 4. The optical recording/reproducing device (not labeled) has a chassis 10 with an opening (not labeled) therein. The fixing seat 3 and the three adjusting seats 4 are located at four corresponding corners of the opening, to receive four ends of the guide shafts 2 therein respectively. Thus, the guide shafts 2 are position right above the opening and are substantially parallel to a top face of the chassis 10.

The fixing seat 3 has two opposite first side walls 301, a first front wall 300 perpendicularly interconnecting the first side walls 301, and a first bottom (not shown) so as to enclose a first groove 30 for receiving one end of one of the guide shafts 2 therein. Two protrusions 302 extend from an interior surface (not labeled) of each first sidewall 301, such that a distance between every two protrusions 302 on two opposite first sidewalls 301 is substantially equal to a diameter of the corresponding guide shaft 2. A hole (not shown) is defined in the first bottom at a blind end of the first groove 30, for engagingly receiving a fixture screw (not labeled).

Figure 2:
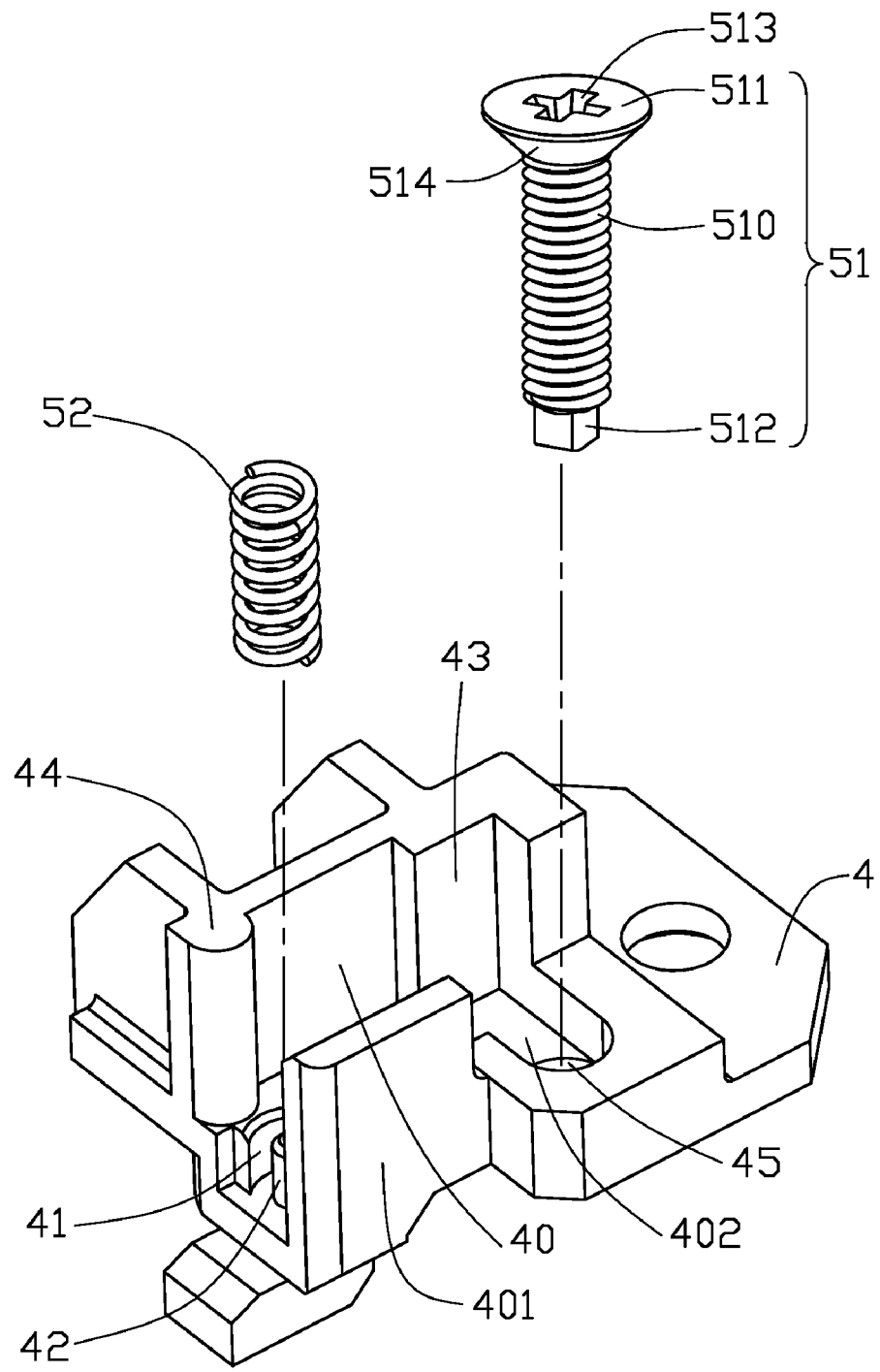
FIG. 2 is an enlarged, exploded view of one of adjusting devices of the pickup head guide apparatus of FIG. 1.

Referring to FIG. 2, each adjusting seat 4 includes a pair of opposite second sidewalls 401, a second bottom 402, an L-shaped block 43 extending backwardly from one second side wall 401, and a bent wall (not labeled) between the L-shaped block 43 and the other second sidewall 401 so as to enclose a second groove 40 for receiving one end of a corresponding guide shaft 2 and to form a fixing means of the adjusting seat 4. A semi-columniform front block 44 extends outwardly from said one of the second sidewalls 401, and a recess 41 is defined in the second bottom 402 near the front block 44. A post 42 extends upwardly from the second bottom 402 at a center of the recess 41, to engage with a part of the corresponding adjusting device 5. A fixture hole 45 is defined in the second bottom 402 at a blind end of the second groove 40, to engagingly receive another part of the adjusting device 5.

Figure 3A:
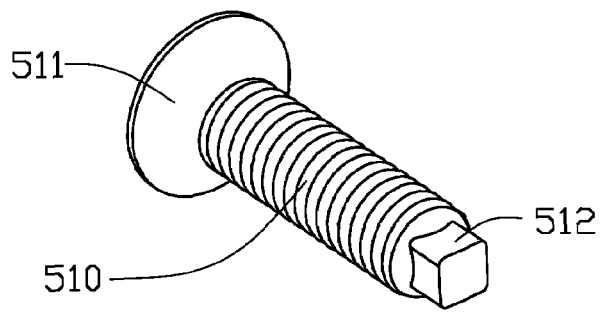
FIG. 3A is an isometric view of a leading screw of the adjusting device of FIG. 2, viewed from another aspect.
Figure 3B:
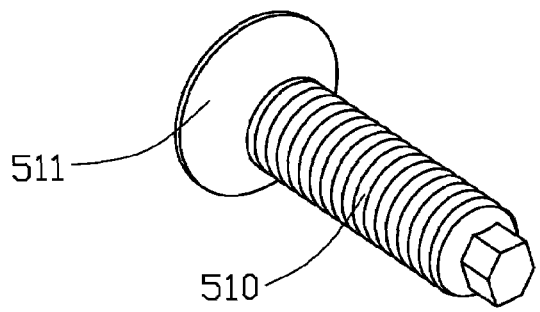
FIGS. 3B-3D are similar to FIG. 3A, but show alternative embodiments of the leading screw of the adjusting device of FIG. 2.
Figure 3C:
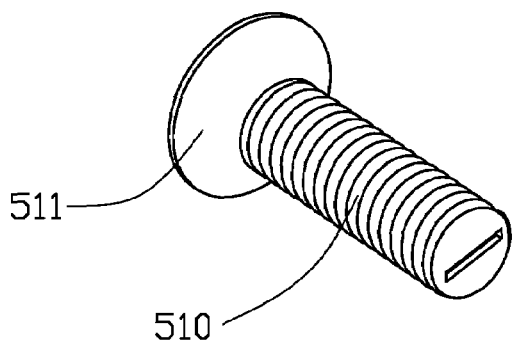
Figure 3D:
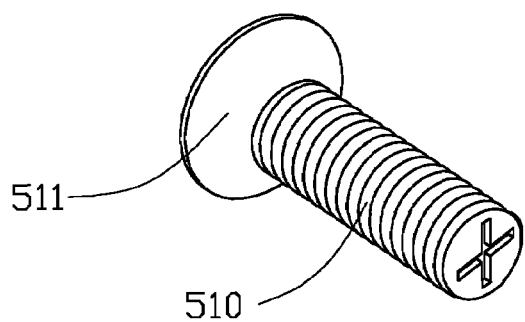

Each adjusting device 5 comprises a leading screw 51 and a spring 52. The leading screw 51 has a pole portion 510 with an outer screw thread (not labeled), a cap portion 511 with an annular slant 514 adjoining the pole portion 510, and an adjusting portion 512 opposite to the cap portion 511. A cross-shaped recess 513 is defined in an end surface of the cap portion 511, to engagingly receive a screwdriver (not shown). Various preferred shapes/configurations of the adjusting portion 512 are shown in FIGS. 3A to 3D, each being adapted to cooperate with a certain kind of fixture tool. FIGS. 3A and 3B respectively show a square-shaped and a hexagonal adjusting portion 512, to which corresponding wrenches can engage. FIGS. 3C and 3D show recessed adjusting portions 512, into which corresponding screwdrivers can engage.

In assembly of the pickup head guide apparatus 1, the springs 52 are accommodated in the recesses 41 such that they surround the posts 42. An optical pickup head (not shown) is mounted on the guide shafts 2. One end of the corresponding guide shaft 2 is accommodated in the first groove 30 of the fixing seat 3 and clamped between the protrusions 302. The screw hole of the fixing seat 3 engagingly receives a fixture screw to further fix said one end of the corresponding guide shaft 2. The other three ends of the two guide shafts 2 are accommodated in the corresponding second grooves 40 and located on the corresponding springs 52. The pole portions 510 of the leading screws 51 are engaged in the fixture holes 45 of the adjusting seats 4, such that the slants 514 partially abut against top sides of the guide shafts 2. Therefore, said other three ends of the two guide shafts 2 are clamped between the slants 514 of the leading screws 51 and the springs 52 in vertical directions, and clamped between the L-shaped blocks 43, front blocks 44 and slants 514 in horizontal directions. Then, the assembled pickup head guide apparatus 1 is sent into a machine for testing of the positions of the guide shafts 2. The locations of the leading screws 51 are finely adjusted manually until the machine shows that the guide shafts 2 are in a precise plane parallel to a corresponding optical disk.

When finely adjusting the location of each guide shaft 51 at a corresponding adjusting device 5, either the recess 513 of the cap portion 511 or the adjusting portion 512 can be selected to effect adjustment. That is, the leading screw 51 is adjustable from a top side or from an underside of the pickup head guide apparatus 1. Therefore, this structure gives the tester a choice as to the most convenient way to perform manual adjustment of the guide shafts 2. In practice, it is usually more convenient to use the adjusting portion 512 to effect adjustment, because an optical disk is usually located above the pickup head guide apparatus 1 when the locations of the guide shafts 2 are tested.

Although the present invention has been described with reference to specific embodiments, it should be noted that the described embodiments are not necessarily exclusive, and that various changes and modifications may be made to the described embodiments without departing from the scope of the invention as defined by the appended claims.

We claim:

1. A pickup head guide apparatus for guiding a pickup head with respect to an information recording face of a disk, said pickup head guide apparatus comprising:
    at least one guide shaft;
    a fixing seat with a first groove therein to accommodate one end of said guide shaft;
    at least one adjusting seat with a second groove therein to accommodate another end of said guide shaft; and
    at least one adjusting device including an elastic element positioned in the second groove, and a fixture element which is adjustable from ends thereof;
    wherein the elastic element and the fixture element engage with said guide shaft to adjust the position of said guide shaft.

2. The pickup head guide apparatus as described in claim 1, wherein said adjusting seat defines a recess at a bottom of the second groove, and the elastic element is partly received in the recess.

3. The pickup head guide apparatus as described in claim 2, wherein a post extends upwardly in the recess for positioning the elastic element.

4. The pickup head guide apparatus as described in claim 1, wherein the fixture element is a screw.

5. The pickup head guide apparatus as described in claim 4, wherein the screw includes a pole portion, a cap portion adjoining the pole portion, and an adjusting portion opposite to the cap portion.

6. The pickup head guide apparatus as described in claim 5, wherein the guide shaft is clamped between the elastic element and the cap portion of the screw.

7. The pickup head guide apparatus as described in claim 5, wherein the cap portion defines a recess in an end face thereof.

8. The pickup head guide apparatus as described in claim 5, wherein the cap portion includes a slant adjoining the pole portion.

9. The pickup head guide apparatus as described in claim 8, wherein the slant abuts against the guide shaft.

10. The pickup head guide apparatus as described in claim 9, wherein the guide shaft is clamped between the slant of the leading screw and a side of said adjusting seat.

11. The pickup head guide apparatus as described in claim 9, wherein the pickup head guide apparatus comprises two guide shafts, three adjusting seats, and three adjusting devices.

12. The pickup head guide apparatus as described in claim 1, wherein the fixing seat includes two side walls, and at least one protrusion extends from each of the side walls to clamp said one end of said guide shaft.

13. The pickup head guide apparatus as described in claim 1, wherein said adjusting seat includes two side walls, and a L-shaped block extending backwardly from one of the side walls.

14. The pickup head guide apparatus as described in claim 1, wherein said adjusting device includes a front block abutting a side of said another end of said guide shaft.

15. The optical pickup head guide apparatus as described in claim 5, wherein the adjusting portion has a square shape or a hexagonal shape or a line-shaped recessed groove or a cross-shaped recessed groove.

16. An optical pickup head guide apparatus for guiding an optical pickup head with respect to an information recording face of an optical disk in an optical disk reproducing device and/or recording device, said optical disk reproducing device and/or recording device having a chassis with an opening therein, said optical pickup head guide apparatus comprising:
- a shaft for guiding an optical pickup over the opening of the chassis;
- fixing means mounted on the chassis for securing the shaft to the chassis; and
- an adjusting device engaging with the fixing means for adjusting the position of the shaft;
- wherein the adjusting device is adjustable from at least two directions.

17. The optical pickup head guide apparatus as described in claim 16, wherein the adjusting device includes an elastic element and a fixture screw, the elastic element is positioned in the fixing means and contacts the shaft, and the fixture screw can be adjusted from either of two opposite ends thereof such that the elastic element is deformed.

18. The optical pickup head guide apparatus as described in claim 17, wherein the fixture screw has a slant pressing a side of the shaft.

19. The optical pickup head guide apparatus as described in claim 17, wherein the fixture screw includes a pole portion, a cap portion provided on an end of the pole portion, and an adjusting portion provided on an opposite end of the pole portion, and the cap portion includes an end face with a recess used for adjusting the fixture screw.

20. The optical pickup head guide apparatus as described in claim 19, wherein the adjusting portion has a square shape or a hexagonal shape or a line-shaped recessed groove or a cross-shaped recessed groove.

* * * * *